United States Patent
Cetinkaya et al.

(10) Patent No.: US 6,979,360 B1
(45) Date of Patent: Dec. 27, 2005

(54) APPARATUS AND PROCESS FOR PREVENTING COKE ACCUMLATION IN A CENTRIPETAL SEPARATOR

(75) Inventors: Ismail B. Cetinkaya, Vernon Hills, IL (US); Keith A. Couch, Arlington Heights, IL (US); Lawrence A. Lacijan, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 25 days.

(21) Appl. No.: 10/436,629

(22) Filed: May 13, 2003

(51) Int. Cl.[7] ............ B01D 45/12; C10G 35/00; B01J 8/08
(52) U.S. Cl. ............ 95/271; 55/459.1; 55/459.5; 208/153; 422/214
(58) Field of Search ............ 55/459.1, 459.5; 95/271; 208/153; 422/214

(56) References Cited

U.S. PATENT DOCUMENTS

| | | | |
|---|---|---|---|
| 1,344,146 A | * 6/1920 | Peck | 55/459.1 |
| 2,535,140 A | 12/1950 | Kassel | 183/83 |
| 2,848,381 A | * 8/1958 | Nicholson | 208/153 |
| 4,101,412 A | 7/1978 | Choi | 208/8 |
| 4,246,013 A | 1/1981 | Truhan et al. | 55/340 |
| 4,670,410 A | 6/1987 | Baillie | 502/41 |
| 4,687,492 A | 8/1987 | Walters et al. | 55/1 |
| 4,792,437 A | 12/1988 | Hettinger, Jr. et al. | 422/147 |
| 5,320,813 A | 6/1994 | Castagnos, Jr. | 422/147 |
| 5,584,985 A | 12/1996 | Lomas | 208/113 |

* cited by examiner

*Primary Examiner*—Robert A. Hopkins
(74) *Attorney, Agent, or Firm*—John G. Tolomei; James C. Paschall

(57) ABSTRACT

In a cyclone separator used for separating solids from gases, we discovered placing at least one opening in a lateral surface of a gas outlet conduit on a side facing away from an inlet to the cyclone separator prevents coke deposits from forming thereon. A plurality of openings may be placed on the side of the lateral surface of the gas outlet conduit facing away from the inlet. In an embodiment, no openings are placed on a side of the lateral surface facing the inlet to the cyclone separator.

17 Claims, 4 Drawing Sheets

APPARATUS AND PROCESS FOR PREVENTING COKE ACCUMLATION IN A CENTRIPETAL SEPARATOR

BACKGROUND OF THE INVENTION

This invention relates generally to an apparatus and process for separating particulate solids from product gases. More specifically, this invention relates to preventing coke from building up inside a cyclone separator.

DESCRIPTION OF THE PRIOR ART

Processes that require separation of solids from gases are numerous. A particularly well known application of such separation is in the hydrocarbon processing industry in which particulate catalyst contact gaseous reactants to effect chemical conversion of the gas stream components or physical changes in the particles undergoing contact with the gas stream. A fluidized catalytic cracking (FCC) process presents one familiar example of such a process. The FCC process cracks higher molecular weight hydrocarbons down to gasoline range hydrocarbons. The FCC process is carried out by contacting hydrocarbonaceous feed material such as vacuum gas oil, reduced crude, or another source of relatively high boiling hydrocarbons with a catalyst made up of finely divided or particulate solid material in an elongated conduit. Contact of the feed with the fluidized catalyst particles catalyzes the cracking reaction while coke is deposited on the catalyst. Catalyst exiting the reaction zone is spoken of as being "spent", i.e., partially deactivated by the deposition of coke upon the catalyst. Spent catalyst is traditionally transferred to a stripper that removes adsorbed hydrocarbons and gases from catalyst and then to a regenerator for purposes of removing the coke by oxidation with an oxygen-containing gas. Regenerated catalyst is returned to the reaction zone. Oxidizing the coke from the catalyst surface releases a large amount of heat, a portion of which leaves the regenerator with the regenerated catalyst. The FCC processes, as well as separation devices used therein are fully described in U.S. Pat. No. 5,584,985 and U.S. Pat. No. 4,792,437.

Efficient separation of particulate catalyst from product vapors is very important in an FCC process. Particulate catalyst that is not effectively separated from product vapors in the FCC unit must be separated downstream either by filtration methods or additional separation devices that multiply separation devices utilized in the FCC unit. Additionally, catalyst that is not recovered from the FCC process represents a two-fold loss. The catalyst must be replaced, representing a material cost, and catalyst lost may cause erosion to downstream equipment. Severe erosion may cause equipment failure and subsequent lost production time. Accordingly, methods of efficiently separating particulate catalyst materials from gaseous fluids in an FCC process are of great utility. Cyclonic methods for the separation of solids from gases are well known and commonly used.

In the FCC process, gaseous fluids are roughly separated from particulate catalyst solids as they are discharged from a reaction conduit. However, additional separation of entrained catalyst solids from product gases is necessary. The most common method of separating particulate solids from a gas stream uses centripetal separation. Centripetal separators are well known and operate by imparting a tangential velocity to gases containing entrained solid particles that forces the heavier solids particles outwardly away from the lighter gases for upward withdrawal of gases and downward collection of solids.

Cyclones for separating particulate material from gaseous materials are well known to those skilled in the art of FCC processing. Cyclones usually comprise an inlet that is tangential to the outside of a cylindrical vessel that forms an outer wall of the cyclone. In the operation of the cyclone, the entry and the inner surface of the outer wall cooperate to create a spiral flow path of the gaseous materials and catalyst that establishes a vortex in the cyclone. The centripetal acceleration associated with an exterior of the vortex causes catalyst particles to migrate towards the outside of the barrel while the gaseous materials enter an interior of the vortex for eventual discharge through an upper gas outlet. The gas outlet extends down into the cyclone, so that gases have to travel downwardly then upwardly to exit the cyclone. The heavier catalyst particles entrained in the gases in large proportion continue downwardly while the gases change direction upwardly. These and other heavier catalyst particles swirling around the sidewall of the cyclone barrel after losing angular momentum eventually drop to the bottom of the cyclone. The catalyst particles then exit the cyclone via a dipleg outlet conduit for recycle through the FCC apparatus. Cyclone arrangements and modifications thereto are generally disclosed in U.S. Pat. No. 4,670,410 and U.S. Pat. No. 2,535,140.

Many refiners have experienced problems with coke formation on the inside surfaces of cyclones in an FCC unit. The likelihood of this occurring increases with processing of heavier feeds. The coke formations can under appropriate circumstances, such as during a thermal cycle, fall off the inside surface and clog the cyclone dipleg. Consequently, excessive catalyst can build up in the cyclone rendering it substantially inefficient. To unclog the dipleg, the unit must be shut down, and the cyclone cleaned out.

U.S. Pat. No. 4,101,412 discloses a cyclone pyrolysis reactor with gas outlet tubes shown in phantom. U.S. Pat. No. 4,246,013 discloses a cyclone separator with a nontangential side of the inlet extending to the gas outlet conduit. An adjustable opening in the gas outlet conduit faces the inlet. U.S. Pat. No. 4,687,492 discloses a noncentrosymmetric coke shield around the gas outlet conduit. U.S. Pat. No. 5,320,813 discloses placing a coke shield above a cyclone around the gas vent tube to prevent an annular gap in the roof of the cyclone around an outlet gas conduit. The coke shield therein comprises a cap with vent openings.

An object of the present invention is to provide an apparatus and process for preventing coke from depositing on a gas outlet conduit of a cyclone separator.

SUMMARY OF THE INVENTION

We have observed that coke can accumulate on a lateral surface of a gas outlet conduit on a side opposite to the inlet to the cyclone separator. We believe that a low catalyst concentration, low velocity film layer is generated on this opposite side of a gas outlet conduit where coke accumulates. Consequently, the present invention involves placing at least one opening in the lateral surface of the gas outlet conduit to vent and thereby activate the stagnant film area. In an embodiment, a plurality of openings is placed in the lateral surface of the gas outlet conduit on the side opposite to the inlet to the cyclone separator. In a further embodiment, the adjacent openings are spaced from each other a distance of less than the inner diameter of the dipleg. Hence, if coke deposits still form despite venting, any spalling coke deposits may be too small to clog the dipleg. In an additional embodiment, no openings are provided in the lateral surface of the gas conduit facing the inlet to the cyclone separator. We predict that the increase in the loss of catalyst due to the openings in the gas outlet conduit is negligible.

DESCRIPTION OF THE INVENTION

The present invention can be used in any apparatus or process in which solids and gases must be separated. However, an FCC process always requires such separations and will be the most widespread application for the present invention, especially due to the tendency of the catalytic cracking reaction to produce coke. Hence, the present invention will be exemplarily described in an FCC application.

Looking first at more details of an FCC process in which the present invention may be used, the typical feed to an FCC unit is a gas oil such as a light or vacuum gas oil. Other petroleum-derived feed streams to an FCC unit may comprise a diesel boiling range mixture of hydrocarbons or heavier hydrocarbons such as reduced crude oils. In an embodiment, the feed stream consist of a mixture of hydrocarbons having boiling points, as determined by the appropriate ASTM test method, above about 230° C. (446° F.) and above about 290° C. (554° F.). The reaction zone of an FCC process is maintained at high temperature conditions which generally include a temperature above about 425° C. (797° F.). In an embodiment, the reaction zone is maintained at cracking conditions which include a temperature of from about 480° to about 590° C. (896° to 1094° F.) and a pressure of from about 69 to about 517 kPa (ga) (10 to 75 psig) but typically less than about 275 kPa (ga) (40 psig). The catalyst-to-oil ratio, based on the weight of catalyst and feed hydrocarbons entering the bottom of the riser, may range up to 20:1 but is typically between about 4:1 and about 10:1. Hydrogen is not normally added to the riser, although hydrogen addition is known in the art. On occasion, steam may be passed into the riser. The average residence time of catalyst in the riser may be less than about 5 seconds. The type of catalyst employed in the process may be chosen from a variety of commercially available catalysts. A catalyst comprising a zeolite base material is preferred, but the older style amorphous catalyst can be used if desired.

The catalyst regeneration zone is preferably operated at a pressure of from about 69 to about 552 kPa (ga) (10 to 80 psig). The spent catalyst being charged to the regeneration zone may contain from about 0.2 to about 15 wt-% coke. This coke is predominantly comprised of carbon and can contain from about 3 to about 12 wt-% hydrogen, as well as sulfur and other elements. The oxidation of coke will produce the common combustion products: water, carbon oxides, sulfur oxides and nitrous oxides. As known to those skilled in the art, the regeneration zone may take several configurations, with regeneration being performed in one or more stages.

Figure 1:
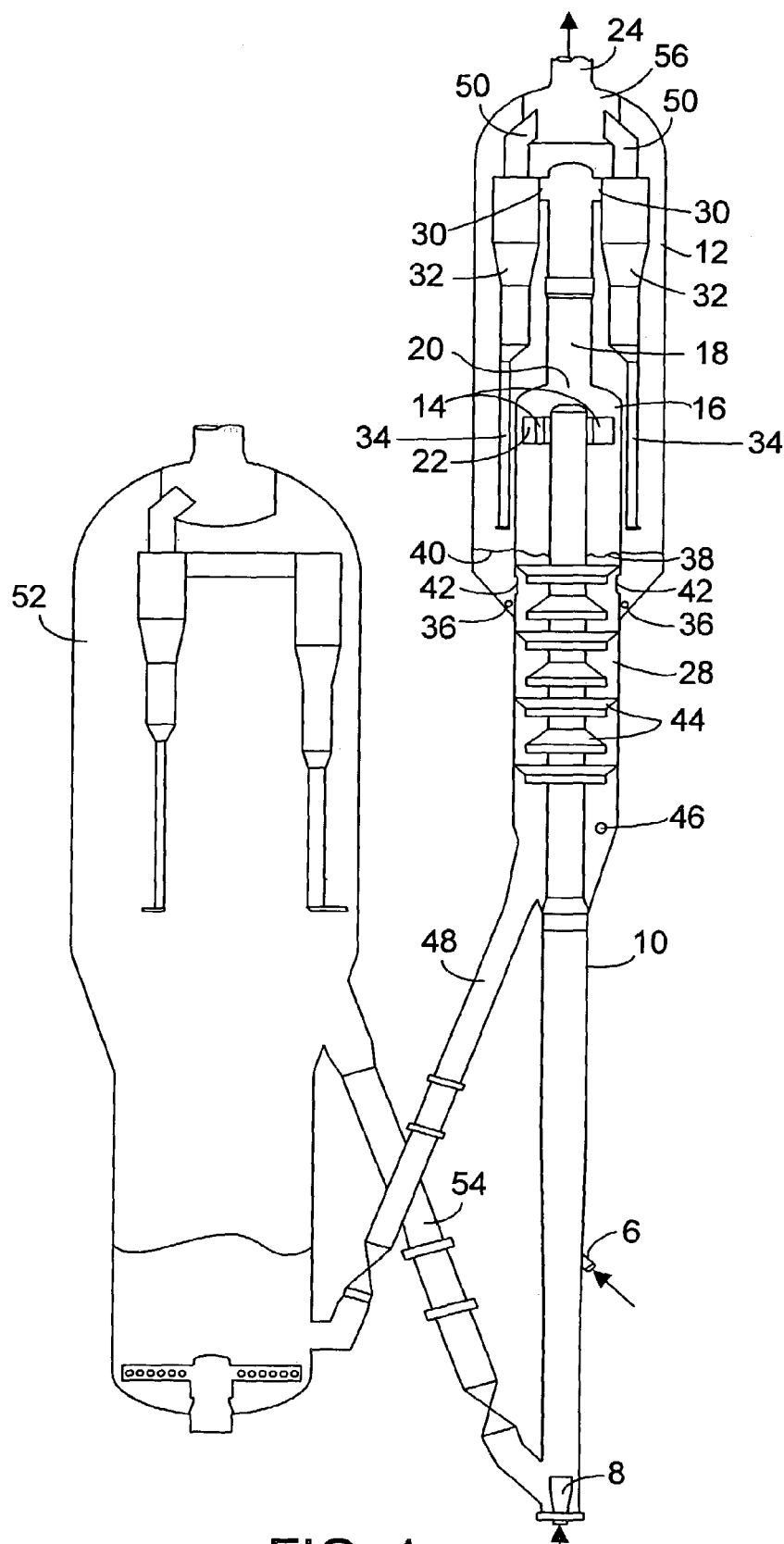
FIG. 1 is a schematic drawing of a fluidized catalytic unit incorporating the present invention.

FIG. 1 is the schematic illustration of an FCC unit embodying the present invention. The FCC unit includes an elongated riser or reactor conduit 10. Hot catalyst is delivered to a lower section of the reactor conduit 10 at which a fluidizing gas from a distributor 8 pneumatically conveys the catalyst particles upwardly through the reactor conduit 10. As the mixture of catalyst and conveying gas continues up the reactor conduit 10, a nozzle 6 injects hydrocarbonaceous feed into the catalyst. The contact with hot catalyst vaporizes the hydrocarbons and further conveys the mixture of gas and catalyst through the reactor conduit 10 while cracking the hydrocarbons to desirable lower boiling products.

The reactor conduit 10 extends upwardly through a reactor vessel 12 as in a typical FCC arrangement. The reactor conduit 10 preferably has a vertical orientation within the reactor vessel 12 and may extend upwardly through a bottom of the reactor vessel 12. The reactor vessel 12 includes a disengaging chamber 16 which may be generally cylindrical. The reactor conduit 10 terminates in the disengaging chamber 16 at swirl exits in the form of swirl arms 14. Each of the swirl arms 14 may be a curved tube that has an axis of curvature that may be parallel to the reactor conduit 10. Each swirl arm 14 has one end communicatively connected to the reactor conduit 10 and another open end comprising a discharge opening 22. The swirl arm 14 discharges a mixture of gaseous fluids comprising cracked product and solid catalyst particles through the discharge opening 22. Tangential discharge of gases and catalyst from the discharge opening 22 produces a swirling helical motion about the cylindrical interior of the disengaging chamber 16 to effect an initial separation of gases from solids. Catalyst particles from the discharge openings 22 collect in the bottom of the disengaging chamber 16 to form a dense catalyst bed 38. The disengaging chamber 16 includes a gas recovery conduit 18 with an inlet 20 through which the spiraling gases ultimately travel. The gases that enter the gas recovery conduit 18 through the inlet 20 will usually contain a light loading of catalyst particles. The inlet 20 recovers gases from the discharge openings 22 as well as stripping gases from a stripping section 28 which may be located in the disengaging chamber 16 as is hereinafter described. The loading of catalyst particles in the gases entering the gas recovery conduit 18 are usually less than 16 kg/m$^3$ (1 lb/ft$^3$) and typically less than 1.6 kg/m$^3$ (0.1 lb/ft$^3$). The gas recovery conduit 18 of the disengaging chamber 16 communicates with an inlet or entrance 30 to one or more cyclones 32 that effect a further removal of catalyst particulate material from the gases exiting the gas recovery conduit 18 of the disengaging chamber 16.

The mixture of gases and solids enters the cyclones 32 through the entrance 30 tangentially to the cylindrical outer wall to establish a vortex that further separates solids from gases. A product gas stream, relatively free of catalyst particles, exits the cyclones 32 through gas conduits 50 into a fluid-sealed plenum chamber 56. The product stream then exits the reactor vessel 12 through an outlet 24. Catalyst solids recovered by the cyclones 32 exit the bottom of the cyclone through diplegs 34. The dipleg 34 delivers catalyst to a dense catalyst bed 40 at the bottom of the reactor vessel 12. The catalyst in the bed 40 may be fluidized by a gas from a distributor 36 and may enter into the bed 38 in the disengaging chamber 16 through windows 42. Catalyst solids in the dense catalyst bed 38 enter the stripping section 28 which may be located in the disengaging chamber 16. Catalyst solids pass downwardly through and/or over a series of baffles 44 in the stripping section 28. A stripping fluid, typically steam, enters a lower portion of the stripping section 28 through at least one distributor 46. Countercurrent contact of the catalyst with the stripping fluid over the baffles 44 displaces product gases adsorbed on the catalyst as it continues downwardly through the stripping section 28. Stripped catalyst from the stripping section 28 may pass through a conduit 48 to a catalyst regenerator 52. In the regenerator, coke deposits are combusted from the surface of the catalyst by contact with an oxygen-containing gas at high temperature. Following regeneration, regenerated catalyst particles are delivered back to the bottom of the reactor conduit 10 through a conduit 54.

Figure 2:
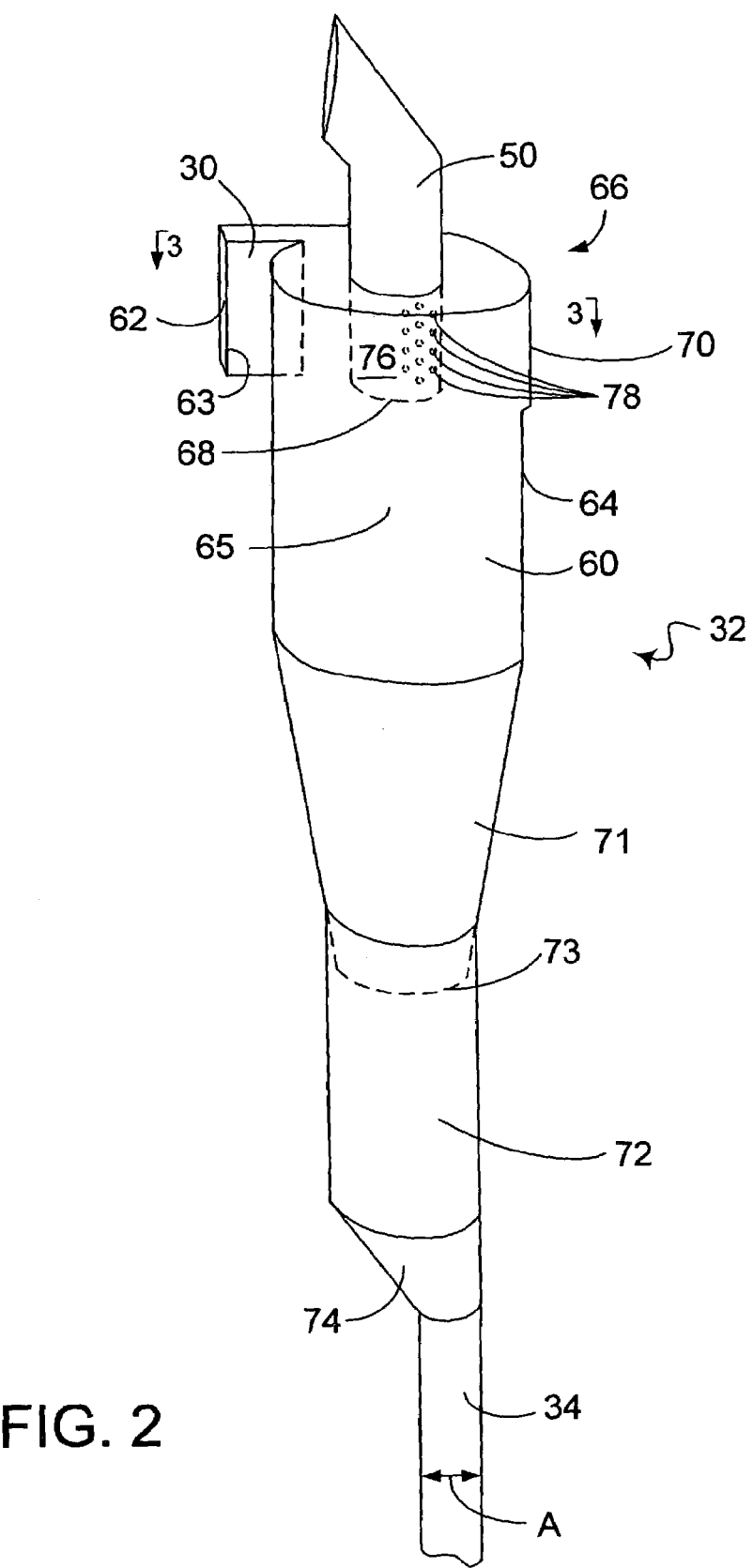
FIG. 2 is a perspective drawing of a cyclone of the present invention.

FIG. 2 shows an enlarged view of part of the cyclone 32. Mixed gases enter into a barrel chamber 60 of the cyclone 32 through the inlet 30 at an upper end 66 of the barrel chamber 60. The inlet 30 may have a generally rectangular cross-section. Circular and other cross-sectional configurations of inlet 30 may be suitable. An outer wall 62 of the inlet 30 may be contiguous with and tangential to a generally round, outer cylindrical wall 64 of the barrel chamber 60. An inner wall 63 of the inlet 30 may be parallel to the outer wall 62 of the inlet 30. Hence, the mixture of gases and solids entering an interior 65 of the barrel chamber follows a contour of the outer cylindrical wall 64 in a helical motion. Centripetal acceleration associated with the helical motion forces the heavier catalyst particles toward the outer cylindrical wall 64 of the barrel chamber 60. The gases, having a lower density than the solid catalyst particles, more easily change direction and begin an upward spiral. Gases enter the gas conduit 50 through an open bottom end 68, in an embodiment, to exit the cyclone 32 with a much lighter loading of solids than upon entry into the cyclone 32. Although the barrel chamber 60 is generally cylindrical, an upper band 70 of the outer cylindrical wall 64 of approximately the same elevation as the inlet 30 may have a gradually decreasing radius of curvature. The radius of curvature of the band 70 is larger than the radius of curvature of the outer cylindrical wall 64 of the barrel chamber 60 at the intersection of the inlet 30 with the barrel chamber 60 but gradually decreases until it shares the same radius of curvature with the generally cylindrical barrel chamber 60. The height of the band 70 may be similar to or the same as the inlet 30. The gas conduit 50 extends from the upper end 66 of the barrel chamber 60 and descends into the barrel chamber 60. The heavier solid particles spiraling around the outer cylindrical wall 64 of the barrel chamber 60 eventually lose angular momentum and spiral downwardly by gravity through an outlet in a frusto-conical bottom 71 of the barrel chamber 60 into a hopper 72. An extension 73 of the frusto-conical bottom 71 may extend into the hopper 72. A second frusto-conical section 74 at the lower end of the hopper 72 is contiguous with the solids conduit or the dipleg 34 which is depicted as broken off in FIG. 2. The dipleg 34 has an inner diameter A and dispenses solids from the cyclone 32. We have observed that coke deposits can accumulate on a lateral surface 76 of the gas conduit. Hence, the present invention includes fashioning at least one opening 78 in the lateral surface 76 of the gas conduit 50 to provide venting and prevent low velocity film layers from forming on the lateral surface. In an embodiment, a plurality of openings 78 is provided in the lateral surface 76. The openings may be holes, slots, slits or any other type of opening that allows gas to pass through the lateral surface 76 of the gas conduit 50. In an embodiment, at least one of the openings and perhaps all of the openings should be spaced from a bottom edge of the gas conduit 50. However, a single or a plurality of openings may extend to the bottom edge of the gas conduit 50. In a further embodiment, at least one opening may be fashioned in the extension 73 of the frusto-conical bottom 71 of the barrel chamber 60 into the hopper 72. Openings therein may activate the volume between the outside of the extension 73 and the inside of a wall of the hopper 72 to prevent coke deposits from forming thereon.

In an embodiment, when a mixture of solids and gases are delivered through the inlet 30 to the interior 65 of the barrel chamber 60, the outer cylindrical wall 64 of the barrel chamber 60 induces the solids and gases to swirl in the barrel chamber 60. The angular momentum compels the heavier solids to move to the outside of the interior 65 and the lighter gases move toward the inside of the interior 65. The solids lose angular momentum and fall to the lower end 72 of the barrel chamber 60 where the solids are dispensed through the dipleg 34. Some of the gases are urged to enter into the opening 78 in the lateral surface 76 of the gas conduit 50 which may extend from the interior 65 to outside of the barrel chamber 60. Product gases with a lighter loading of catalyst than in the inlet are then recovered from the gas conduit 50. In an embodiment, most of the gases enter through an open bottom of the gas conduit 50 for recovery.

Figure 3:
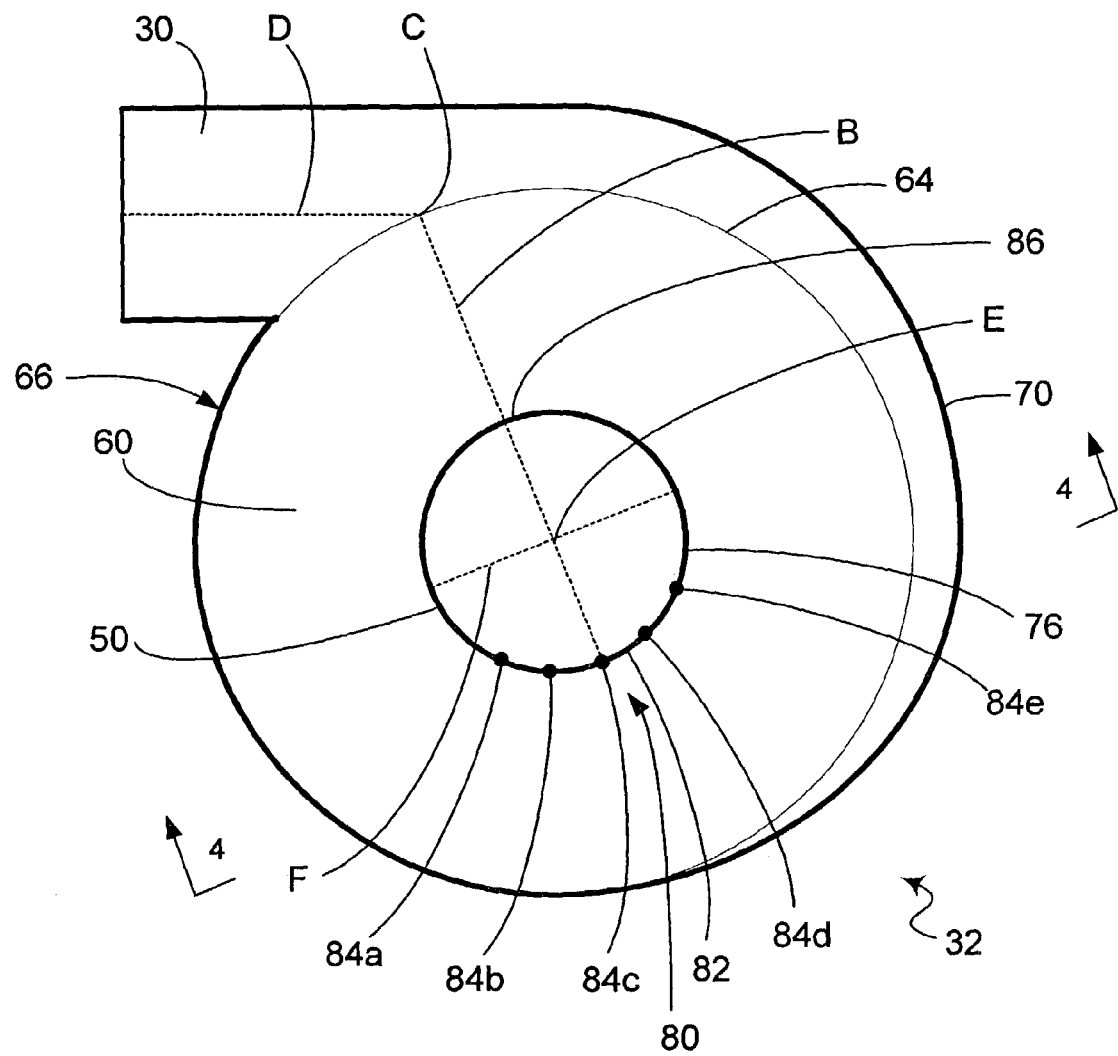
FIG. 3 is a cross-sectional view taken along segment 3—3 in FIG. 2.

FIG. 3 shows a sectional view taken at the upper end 66 of the barrel chamber 60. The low velocity film area 80 is generated in the cyclone 32 on an opposite side 82 of the lateral surface 76 of the gas conduit 50 that faces away from the inlet 30. A general middle of the low velocity film area 80 generated is on line with an imaginary line B between an intersection C of an imaginary center line D of the inlet 30 with an upwardly projected imaginary cylinder defined by the outer cylindrical wall 64 of the barrel chamber 60 below any band 70 and a center E of the barrel chamber 60. Hence, the middle of the low velocity film area 80 is 180 degrees from the intersection of the center line D and the cylinder projected upwardly from the cylindrical wall 64. In other words, the middle of the low velocity film area 80 is at the second intersection of the imaginary line B and lateral surface 76. Imaginary line F which bisects the circular cross section of gas conduit 50 and is perpendicular to imaginary line B demarks opposite side 82 from a near side 86 of the cylindrical lateral surface of gas conduit 50 that faces the inlet 30. In an embodiment, at least one opening 78 (FIG. 2) is provided on the side 82 of the lateral surface 76 of the gas conduit 50 adjacent to the stagnant area 80. In an embodiment, a plurality of openings are arrayed on the side 82 of the lateral surface 76 facing away from the inlet 30. In an embodiment, five columns 84a–84e of openings, represented by dots in FIG. 3, may be arrayed on the side 82 with the middle column 84c on line with the line B. In an embodiment, no openings are provided in the near side 86 of the lateral surface 76 facing toward the inlet 30, particularly where imaginary line B first intersects lateral surface 76 of the gas conduit 50. Openings positioned on the near side 86 could increase the risk of substantial catalyst entry into the gas conduit 50, thereby reducing separation efficiency. Hence, in this embodiment one or more openings are provided only on the opposite side 82 of the lateral surface 76 of the gas conduit 50.

Figure 4:
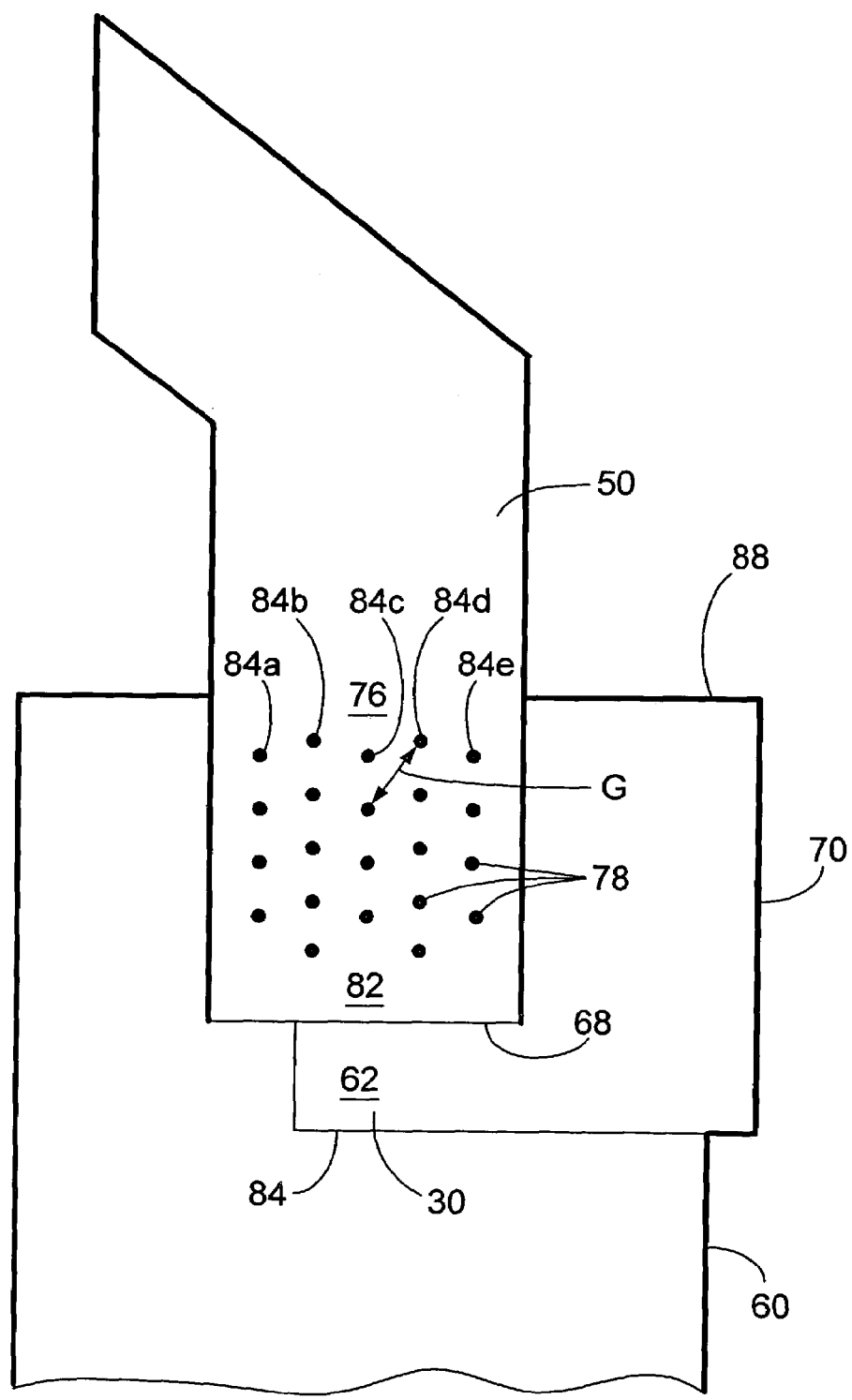
FIG. 4 is a sectional view taken along segment 4—4 in FIG. 3.

FIG. 4 is a sectional view showing the opposite side 82 of the lateral surface 76 of the gas conduit 50. Although any arrangement of the openings 78 may be suitable, FIG. 4 shows the openings 78 arranged in the five columns 84a–84e. In the embodiment shown in FIG. 4, the columns 84a–84e have staggered alternating elevations, such that the columns 84b and 84d have five openings 78; whereas, the columns 84a, 84c and 84e have only four openings 78. Hence, the openings 78 define a triangular pitch pattern such that the openings 78 in the adjacent columns 84a–84e are relatively diagonally positioned. In an embodiment, the greatest distance G between the adjacent openings 78 is smaller than the inner diameter A of the dipleg 34 (FIG. 2). Hence, if coke deposits do form on the opposite side 82 of the lateral surface 76 of the gas conduit 50 and spall off, the largest dimension of the deposit would likely be too small to clog the dipleg 34. Even though coke deposits with a shape that meanders around openings 78 may still have a dimension that is larger than inner diameter A of the dipleg, the twofold approach of providing openings 78 to activate the stagnant film area and placement of the openings to mitigate the size of coke deposits should make clogging of the dipleg 34 extremely unlikely. In an embodiment, the diameter of the openings 78 are between about 1.9 to about 3.8 cm (0.75 to 1.50 inches) and the spacing between openings 78 should be about 10.2 to about 15.2 cm (4 to 6 inches). In an embodiment, the density of the openings 78 should be about 107 to about 269 openings per square meter (10 to 25 openings per square foot). Additionally, in an embodiment, a top row of openings 78 should be no closer than 2.5 cm (1 inch) from a roof 88 of the cyclone 32. In FIG. 4, a bottom 84 of the inlet 30 is seen coincident with a bottom of the band 70 with the outer wall 62 in the background. In an embodiment in FIG. 4, the bottom end 68 of the gas conduit 50 is disposed no lower than an elevation of the bottom of the inlet 30. In an embodiment, the bottom end 68 is spaced from the elevation of the bottom 84 of the inlet 30. Moreover, in an embodiment, the bottom end 68 may extend below the bottom 84 of the inlet. If a refractory lining is disposed on the lateral surface 76, the openings may be disposed between the retention grids that support the refractory.

What is claimed is:

1. An apparatus for separating solids from gases comprising:
    a barrel chamber including a round outer wall, an upper end and a lower end;
    a solids conduit at the lower end of said barrel chamber for dispensing solids from said barrel chamber;
    an inlet near said upper end of said barrel chamber for delivering a mixture of solids and gas to said barrel chamber; and
    a gas conduit extending from said upper end of said barrel chamber for recovering gases from said barrel chamber, said gas conduit extending into said barrel chamber and defining a lateral surface with a plurality of openings in an opposite side of the lateral surface facing away from the inlet.

2. The apparatus of claim 1 wherein each of said openings in said plurality is spaced from an adjacent opening by a distance that is smaller than a diameter of said solids conduit.

3. The apparatus of claim 1 wherein said gas conduit has an open lower end.

4. The apparatus of claim 1 wherein said inlet comprises a conduit that is tangential to said outer wall of said barrel chamber.

5. The apparatus of claim 1 wherein said barrel chamber includes a frusto-conical section near the lower end.

6. The apparatus of claim 1 wherein said gas conduit has a lower end disposed no lower than a bottom of said inlet.

7. The apparatus of claim 1 wherein at least one opening in said gas conduit is facing away from said inlet.

8. The apparatus of claim 1 wherein no openings in said gas conduit face toward said inlet.

9. An apparatus for separating solids from gases comprising:
    a barrel chamber including a round outer wall, an upper end and a lower end;
    a solids conduit at the lower end of said barrel chamber for dispensing solids from said barrel chamber;
    an inlet near said upper end of said barrel chamber for delivering a mixture of solids and gas to said barrel chamber; and
    a gas conduit extending from said upper end of said barrel chamber for recovering gases from said barrel chamber, said gas conduit extending into said barrel chamber and defining a lateral surface with a plurality of openings in a side of said lateral surface facing away from said inlet and no opening in a side of the lateral surface facing toward said inlet.

10. The apparatus of claim 9 wherein each of said openings in said plurality is spaced from an adjacent opening by a distance that is smaller than a diameter of said solids conduit.

11. The apparatus of claim 9 wherein said gas conduit has an open lower end.

12. The apparatus of claim 9 wherein said inlet comprises a conduit that is tangential to said outer wall of said barrel chamber.

13. The apparatus of claim 9 wherein said barrel chamber includes a frusto-conical section near the lower end.

14. The apparatus of claim 9 wherein said gas conduit has a lower end disposed no lower than a bottom of said inlet.

15. A process for separating solids from gases comprising:
    delivering a mixture of solids and gases to an interior of a barrel chamber;
    inducing said solids and gases to swirl in said barrel chamber, so that said solids move to the outside of the interior and said gases move toward the inside of said interior;
    allowing said solids to fall to a lower end of said barrel chamber;
    dispensing said solids from said barrel chamber;
    urging at least some of said gases to enter a plurality of openings in a side of a lateral surface of a gas conduit facing away from an inlet to said barrel chamber, said gas conduit extending from said interior of said barrel chamber to outside of said barrel chamber; and
    recovering said gases from said gas conduit.

16. The process of claim 15 further including urging other of said gases to enter an open bottom of said gas conduit.

17. The process of claim 15 further including passing said solids to a regenerator for regeneration and then to a reactor of an FCC unit.

\* \* \* \* \*